United States Patent
Waggenspack et al.

(10) Patent No.: US 6,358,889 B2
(45) Date of Patent: Mar. 19, 2002

(54) VISCOSIFIED AQUEOUS CHITOSAN-CONTAINING WELL DRILLING AND SERVICING FLUIDS

(75) Inventors: John H. Waggenspack, Lafayette, LA (US); Roy F. House, Houston, TX (US); Kimely P. Pitre, Lafayaette, LA (US)

(73) Assignee: Venture Innovations, Inc., Lafayette, LA (US)

( * ) Notice: Subject to any disclaimer, the term of this patent is extended or adjusted under 35 U.S.C. 154(b) by 0 days.

(21) Appl. No.: 09/782,633

(22) Filed: Feb. 13, 2001

Related U.S. Application Data

(63) Continuation-in-part of application No. 09/222,293, filed on Dec. 28, 1998, now Pat. No. 6,258,755.

(51) Int. Cl.[7] .................................................. C09K 7/02
(52) U.S. Cl. ........................ 507/110; 507/209; 507/211
(58) Field of Search ................................. 507/110, 209, 507/211; 536/20, 55.3

(56) References Cited

U.S. PATENT DOCUMENTS

| | | | | |
|---|---|---|---|---|
| 3,953,608 A | * | 4/1976 | Vanlerberghe et al. | 536/20 |
| 4,996,307 A | * | 2/1991 | Itoi | 536/20 |
| 5,077,052 A | * | 12/1991 | Franzoni et al. | 536/20 |

* cited by examiner

*Primary Examiner*—Philip Tucker
(74) *Attorney, Agent, or Firm*—Roy F. House

(57) ABSTRACT

The invention provides well drilling and servicing fluids comprising an alkaline aqueous liquid containing chitosan, an anhydride, and an aldehyde therein. The invention further provides a method of drilling a well wherein there is circulated in the wellbore during drilling a drilling fluid comprising an alkaline aqueous liquid containing chitosan and an anhydride, and optionally an aldehyde therein.

26 Claims, No Drawings

VISCOSIFIED AQUEOUS CHITOSAN-CONTAINING WELL DRILLING AND SERVICING FLUIDS

The present patent application is a continuation-in-part application of patent application Ser. No. 09/222,293 filed Dec. 28, 1998, now U.S. Pat. No. 6,258,755 incorporated herein by reference.

This invention was made with Government support under Award No. DMI-9901868 awarded by the National Science Foundation. The Government has certain rights in this invention.

FIELD OF THE INVENTION

The invention pertains to the in-situ modification of chitosan to produce viscosifiers (thickeners, gellants) for aqueous liquids, and to viscosified aqueous well drilling and servicing fluids containing such modified chitosans dispersed therein, and to methods of drilling a well utilizing such fluids.

BACKGROUND OF THE INVENTION

Many viscosifiers for, and methods of, increasing the viscosity of aqueous liquids are known. Such viscosifiers may be so-called water-soluble polymers such as biopolymers, gums, cellulose derivatives, alginates, and other polysaccharides or polysaccharide derivatives, and various synthetic polymers. Representative polymers are set forth in the book "Handbook of Water Soluble Gums and Resins," Robert L. Davidson, Ed., 1980.

Noticeably absent from this book is any mention of chitosan or derivatives thereof.

Viscoelastic fluids are characterized as having a rheological profile which is shear thinning, having a high viscosity at extremely low shear rates and a low viscosity at high shear rates. Thus such fluids are pseudoplastic having a high yield stress.

This type of rheology is produced by hydrating in the fluid certain water soluble polymers. These polymers presently known are biopolymers, i.e., microbially produced polysaccharides or heteropolysaccharides, and are well known in the art.

There is a need for fluids which exhibit a high low shear rate viscosity which are shear thinning.

Chitosan is a partially or fully deacetylated form of chitin, a naturally occurring polysaccharide. Structurally, chitin is a polysaccharide consisting of beta-(1→4)2-acetamido-2-deoxy-D-glucose units, some of which are deacetylated. The degree of deacetylation usually varies between 8 and 15 percent, but depends on the species from which the chitin is obtained, and the method used for isolation and purification.

Chitin is not one polymer with a fixed stoichiometry, but a class of polymers of N-acetylglucosamine with different crystal structures and degrees of deacetylation, and with fairly large variability from species to species. The polysaccharide obtained by more extensive deacetylation of chitin is chitosan.

Like chitin, chitosan is a generic term for a group of polymers of acetylglucosamine, but with a degree of deacetylation of between 50 and 100 percent. Chitosan is the beta-(1–4)-polysaccharide of D-glucosanine, and is structurally similar to cellulose, except that the C-2 hydroxyl group in cellulose is substituted with a primary amine group in chitosan. The large number of free amine groups (pKa=6.3) makes chitosan a polymeric weak base. Both chitin and chitosan are insoluble in water, dilute aqueous bases, and most organic solvents. However, unlike chitin, chitosan is soluble in dilute aqueous acids, usually carboxylic acids, as the chitosonium salt. Solubility in dilute aqueous acid is therefore a simple way to distinguish chitin from chitosan.

Chitosan is unique in that it is a polysaccharide containing primary amine groups. Chitosan forms water-soluble salts with many organic and inorganic acids.

It is known to prepare chitosan derivatives by attaching various groups to one or more hydroxyl groups of the chitosan, as in various cellulose derivatives, and/or in attaching various groups to the primary amino group of chitosan. Thus it is disclosed in Hall and Yalpani U.S. Pat. No. 4,424,346 that chitosan can be reacted with various aldehydes by Schiff base formation with the primary amino group. The reaction is conducted in the presence of a reducing agent, specifically sodium cyanoborohydride, to reduce the imino group formed to a secondary amino group, i.e., the chitosan undergoes reductive alkylation. The aldehyde reactants include aldose or ketose sugars, or sugars oxidizable or hydrolyzable to aldoses or ketoses, for example, glucose, galactose, arabinose, xylose, N-acetylglucosamine, lactose, cellobiose, maltose, and melibiose, and aromatic aldehydes containing at least one hydroxyl or carboxyl group. Example 5 specifically discloses the reductive alkylation of chitosan with lactose at weight ratios of lactose/chitosan of 2.4 (Product A), 3.0 (Product B, Product C), and 6.0 (Product D), to form products having the group—NHR' therein, where R' is an aldose or ketose residue. When the reaction was carried out in the absence of the sodium cyanoborohydride reducing agent at a weight ratio of lactose/chitosan of 8.0, the resulting product was minimally reacted with a degree of substitution of only 0.1. The reactions were carried out at room temperature. A paper which discusses the preparation and characteristics of the chitosan derivatives set forth in the Hall et al. U.S. Pat. No. 4,424,346 is "Some Chemical and Analytical Aspects of Polysaccharide Modifications. 3. Formation of Branched-Chain, Soluble Chitosan Derivatives," M. Yalpani and L. D. Hall, MACROMOLECULES 1984, 17, 272–281. These chitosan derivatives are disclosed to offer a wide range of solubility, gelling and compatibility properties.

A paper entitled "Chitosan Derivatives Bearing $C_{10}$-Alkyl Glycoside Branches: A Temperature-Induced Gelling Polysaccharide," K. R. Holme and L. D. Hall, Macromolecules 1991, 24, 3828–3833, discloses chitosan derivatives having mixed hydrophobic/hydrophilic branches.

U.S. Pat. No. 3,879,376, incorporated herein by reference, discloses chitosan derivatives formed by acylation of chitosan with a saturated or unsaturated organic diacid anhydride and their use as a skin-moisturizing agent in cosmetic compositions.

The following papers disclose the reaction of chitosan with various anhydrides, each incorporated herein by reference: (1) "Formation and Characterization of a Physical Chitin Gel," L. Vachoud et al., Carbohydrate Research 302 (1977), 169–177; (2) "Chitosan Film Acylation and Effects on Biodegradability," Jin Xu et al., Macromolecules 1996, 29, 3436–3440; (3) "N-Acetylchitosan Gel: A Polyhydrate of Chitin," Shigehero Hirans et al., Biopolymers 15 (1976), 1685–1691.

There is disclosed in co-pending U.S. patent application Ser. No. 09/222,293 filed Dec. 28, 1998, well drilling fluids containing chitosan and aldose or ketose sugars, and/or oligosaccharides of such sugars.

SUMMARY OF THE INVENTION

We have now determined that aqueous alkaline fluids useful in oil and gas well operations, such as drilling, fracturing, sand control, lost circulation control, completion, workover and the like can be formulated to contain chitosan and an anhydride modifier. The chitosan and anhydride react to increase the viscosity of the fluid. Optionally, the fluids can contain an aldehyde modifier to increase the viscosity or enhance the stability of the fluids.

Thus, it is an object of the invention to provide aqueous alkaline well drilling and servicing fluids containing chitosan and an anhydride modifier.

It is another object of the invention to provide aqueous well drilling and servicing fluids containing chitosan, an anhydride modifier, and a modifier selected from the group consisting of an aldehyde, pyruvic acid, and mixtures thereof.

Another object of the invention is to provide a method of drilling a well comprising circulating in a wellbore during drilling an aqueous alkaline fluid containing chitosan and an anhydride modifier therefore.

Still another object of the invention is to provide a method of drilling a well comprising circulating in a wellbore during drilling an aqueous alkaline fluid containing chitosan, an anhydride modifier, and a modifier selected from the group consisting of an aldehyde, pyruvic acid, and mixtures thereof Yet another object of the invention is to provide aqueous alkaline fluids useful in oil and gas well operations comprising an aqueous liquid having incorporated therein chitosan, an anhydride modifier, optionally an aldehyde modifier, optionally pyruvic acid, and an alkalizing additive.

These and other objects of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION AND PREFERRED EMBODIMENTS

The invention provides oil and gas well drilling and servicing fluids containing chitosan which is modified in-situ with one or more anhydrides and, optionally, one or more aldehydes and/or pyruvic acid. The fluids are useful in various operations such as drilling, fracturing, sand control, lost circulation control, completion, workover, and the like. The preferred fluids are alkaline aqueous pseudoplastic fluids having a Brookfield 0.5 rpm viscosity (hereinafter sometimes referred to as "low shear rate viscosity" or "LSRV") of at least 5,000 centipoise and a shear thinning index (hereinafter sometimes referred to as "STI") greater than about 10. The STI is the ratio of the Brookfield viscosity at 0.5 rpm to the Brookfield viscosity at 100 rpm and is an indication of the shear thinning, pseudoplastic characteristic of the fluids. Preferably the LSRV is at least about 10,000 centipoise, most preferably at least about 20,000 centipoise.

The chitosans useful in the fluids will have at least 50% of their amino groups deacetylated, i.e., the degree of deacetylation is at least 50%, preferably at least 70%, and most preferably from about 85% to 100%.

The concentration of chitosan in the fluids will be sufficient, when reacted in-situ with the anhydride(s) and aldehyde(s) and optional pyruvic acid, to impart to the fluids the rheological characteristics desired. Generally the concentration of chitosan will be from about 0.5 lb/bbl (0.143 % w/v) to about 5 lb/bbl (1.429% w/v), preferably from about 1 lb/bbl (0.286 % w/v) to about 4 lb/bbl (1.143 % w/v).

The fluids are initially preferably prepared by forming an acidic aqueous chitosan solution/dispersion containing the anhydride modifier, wherein the pH is from about 2 to about 6, preferably from about 3 to about 5.5, and thereafter raising the pH to basic, i.e., to a pH of about 7.5 or above, preferably from about 8 to about 11.

A wide variety of acids can be used to solublize chitosan. Such acids include inorganic acids such as hydrochloric acid, nitric acid, and sulfamic acid, and water soluble organic acids represented by the formula: R—(COOH)$_n$ wherein n has a value of 1 to 3 and R represents a mono- or divalent organic radical composed of carbon, hydrogen, and optionally at least one of oxygen, nitrogen, and sulfur. Exemplary organic acids are the mono- and dicarboxylic acids such as formic, acetic, N-acetylglycine, acetylsalicylic, glycolic, lactic, malic, 2-pyrrolidone-5-carboxylic, salicylic, glutamic, glutaric, malonic, and thioglycolic acids.

The preferred acid used to prepare the acidic chitosan solution is selected from the group consisting of (a) monocarboxylic acids containing from one to three carbon atoms, (b) substituted monocarboxylic acids containing at least one radical per molecule selected from the group consisting of hydroxyl, amino, chloro, and thio, and containing from one to three carbon atoms, and (c) mixtures thereof.

The concentration of acid should be sufficient to decrease the pH of the solution to less than about 6.0, preferably 5.5 or less.

The basic compound used to raise the pH to the alkaline range can be any compatible base which can be determined by routine testing. Preferred basic compounds are the alkali metal and ammonium hydroxides, carbonates and bisulfites, and mixtures thereof. Organic bases such as low molecular weight amines and hydroxyamines, such as ethanolamine and the like, can be used to raise the pH, also in combination with an inorganic basic compound. Preferred bases are the alkali metal carbonates.

The water base borehole fluids and well servicing fluids of this invention generally will contain materials well known in the art to provide various characteristics of properties to the fluid. Thus the fluids may contain one or more viscosifiers or suspending agents in addition to the chitosan, weighting agents, corrosion inhibitors, soluble salts, biocides, fungicides, seepage loss control additives, bridging agents, deflocculants, lubricity additives, shale control additives, pH control additives, and other additives as desired.

The borehole fluids may contain one or more materials which function as encapsulating or fluid loss control additives to restrict the entry of liquid from the fluid to the contacted shale. Representative materials known in the art include partially solublized starch, gelatinized starch, starch derivatives, cellulose derivatives, humic acid salts (lignite salts), lignosulfonates, gums, biopolymers, synthetic water soluble polymers, and mixtures thereof.

The oil and gas well drilling and servicing fluids of this invention preferably have a pH in the range from about 7.5 to about 11.5, most preferably from 8 to about 11.

If desired, water soluble potassium compounds can be incorporated into the fluids of this invention to increase the potassium ion content thereof. Thus it is known to add potassium chloride, potassium formate, potassium acetate, and the like to fluids to enhance the shale stabilizing characteristics of the fluids.

The well drilling and servicing fluids of this invention contains an aqueous phase which may be fresh water, a natural brine, sea water or a formulated brine. The formulated brine is manufactured by dissolving one or more soluble salts in water, a natural brine, or sea water. Representative soluble salts are the chloride, bromide, acetate and formate salts of potassium, sodium, calcium, magnesium and zinc. The preferred salts contain a monovalent cation.

The borehole fluid of this invention is circulated or spotted within a borehole during well drilling or servicing operations as is well known in the art. Fracturing fluids are used to hydraulically fracture subterranean formations as is well known in the art.

The anhydride modifiers suitable for use in the present invention are saturated or unsaturated organic diacid anhydrides, substituted products of such anhydrides, and mixtures thereof, wherein the substituted products contain one or more functional groups selected from the group consisting of hydroxyl, carboxyl, alkenyl, amino, and mixtures thereof. Exemplary saturated anhydrides are succinic anhydride (preferred), acetoxysuccinic anhydride, methylsuccinic anhydride, diacetyl tartaric anhydride, tartaric anhydride, glutaric anhydride, glutamic anhydride, and the like. Exemplary unsaturated anhydrides used can be maleic anhydride (preferred), itaconic anhydride, citraconic anhydride, dodecenylsuccinic anhydrides, octadecenylsuccinic anhydride, other alkenyl succinic anhydrides, and the like wherein the alkenyl group contains from about 2 to about 20 carbon atoms, and mixtures thereof.

The concentration of anhydride in the fluid is from about 10% to about 250% of the weight of chitosan in the fluid, i.e., the weight ratio of anhydride to chitosan is from about 0.1 to 1 to about 2.5 to 1. It is preferred that the weight ratio of the succinic anhydride to chitosan is from about 0.1 to 1 to about 1.5 to 1.

Alkanoic acid anhydrides (alkanoic anhydrides) such as acetic anhydride, propionic anhydride, butyric anhydride, dodecanoic anhydride, and the like can be used together with the organic diacid anhydrides.

The fluids of the invention can also optionally contain one or more aldehydes to react with the chitosan and the acylated chitosan derivatives present in the fluids. Representative aldehydes include alkanals containing from 1 to 20 carbon atoms, substituted alkanals containing one or more functional groups selected from the group consisting of hydroxyl, carboxyl, amino, keto, aldehydo (—CHO), and mixtures thereof, benzaldehyde, substituted benzaldehydes wherein the benzene ring contains one or more functional groups selected from the group consisting of hydroxyl, carboxyl, and mixtures thereof, aldose or ketose sugars and oligosaccharides of the sugars containing up to about 10 sugar groups per molecule, and mixtures thereof Exemplary alkanals are formaldehyde, propional, butanal, dodecanal, and the like. Exemplary substituted alkanals contain such substituent groups as hydroxyl, carboxyl, amino, keto, —CHO, and the like, such as glyoxal, glutaraldehyde, glyceraldehyde, and pyruvaldehyde. Exemplary substituted benzaldehydes include salicylaldehyde, 4-carboxybenzaldehyde, 4-hydroxybenzaldehyde, vanillin, 3-formyl-2-hydroxybenzaldehyde, and the like. Representative sugars are selected from the group consisting of arabinose, galactose, glucose, mannose, xylose, and mixtures thereof. Oligosaccharides containing from about two to about ten combined sugar units from the above group may be present in the fluids of the invention.

A preferred oligosaccharide is lactose, a disaccharide containing one glucose sugar unit and one galactose sugar unit per molecule. Other suitable oligosaccharides include such disaccharides as dextrose, maltose, melibiose, and cellobiose.

A mixture of oligosaccharides (hereinafter sometimes referred to as "OSM") useful in the present invention is obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans, 40% by weight; pentosans, 30% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. From the above description it will be seen that the major proportion of the water solubles consists of carbohydrate material. A more detailed analysis of the water solubles has indicated that the carbohydrate mixture is composed of oligosaccharides consisting of mannose, arabinose, glucose, galactose, and xylose sugar units. The crude water solubles from which relatively all of the suspended material has been removed consists almost entirely of the above described oligosaccharide mixture. There is a relatively small fraction present, about up to about 15% thereof, of monosaccharides. A larger fraction of the dissolved solids, i.e., greater than about 50% thereof, consists of hexose and pentose oligosaccharides containing from 2 to 5 of the corresponding monosaccharide sugar units which are predominantly those named above. The remainder of the dissolved solids has been found to consist of oligosaccharides having more than about 6 sugar units of the same 5 and 6 carbon characters. In most instances, the filter water solubles contain only from about 3 to about 5% of lignin.

Other oligosaccharide mixtures useful in the practice of this invention include cane syrup solids, corn solubles, and the like.

Generally the concentration of the aldehyde will be from about 0.7 kg/m$^3$ (0.25 ppb) to about 57 kg/m$^3$ (20 ppb), preferably from about 0.7 kg/m$^3$ (0.25 ppb) to about 43 kg/m$^3$ (15 ppb).

As indicated hereinbefore, the fluids of this invention can contain pyruvic acid. Generally the concentration of pyruvic acid, if present, will be from 0.1 kg/m$^3$ to about 2.85 kg/m$^3$ (1 ppb).

Mixtures of chitosan and the anhydride, optionally with the optional aldehyde and optional pyruvic acid, can be prepared for addition to the alkaline fluids of this invention for maintenance of the properties thereof, or indeed, for preparing the initially prepared acidic oil and gas well drilling and servicing fluids before adding the alkalizing additive thereto. Preferably the mixture of chitosan and the anhydride are treated such that the chitosan and the anhydride are at least partially reacted prior to addition to the fluid.

As indicated hereinbefore, the fluids set forth herein are useful in drilling a well wherein there is circulated in a wellbore (borehole) a drilling fluid during the drilling thereof. Such processes are well known in the art. Generally, the method of drilling a well penetrating a subterranean formation comprises circulating an aqueous alkaline chitosan and anhydride-containing fluid as set forth herein through the well by introducing the drilling fluid into the well and into contact with the formation and withdrawing the drilling fluid from the well to remove cuttings therefrom. The fluids can be formulated for use as spotting fluids for use in releasing stuck pipe or tools within a borehole wherein the fluid is circulated to the depth in the borehole of the stuck pipe or tool and in a volume sufficient to displace the fluid in the borehole over the entire stuck area, and allowing the spotting fluid to soak for a period of time sufficient to release the stuck pipe or tool. The fluids can be formulated to provide viscous gels to overcome lost circulation problems in a wellbore as is known in the art.

In order to more completely describe the invention, the following non-limiting examples are given. In these examples and in this specification, the following abbreviations may be used: ml=milliliter; g=gram; cp=centipoise; ppb=pounds per 42 gallon barrel; OS=off-scale; PV=API plastic viscosity in centipoise; YP=API yield point in pounds per 100 square feet; rpm=revolutions per minute; API=American Petroleum Institute; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; OSM=oligosaccharide mixture obtained from thermally hydrolyzed wood; DDSA=dodecenylsuccinic anhydride; lb/bbl=pounds per 42 gallon barrel; bbl=42 gallon barrel; lb/gal=pounds per gallon; lb/100 ft$^3$=pounds per 100 square feet; kg/m$^3$=kilograms per cubic meter.

EXAMPLE 1

A chitosan/succinic anhydride powder was prepared by ball milling for one hour 50 grams of chitosan and 28 grams of succinic anhydride. Fluids were prepared from this powder containing 1 lb/bbl commercial household bleach disinfectant (sodium hypochlorite), 5 lb/bbl of this chitosan/anhydride powder, 5.6 lb/bbl of OSM, 2.4 lb/bbl of magnesium oxide, 1 lb/bbl BLUE STREAK™ surfactant, 0.5 lb/bbl ACTIGUARD™ shale inhibitor/lubricant, 2 lb/bbl soda ash, and the quantities of sodium chloride, soda ash, or borax set forth in Table A. These fluids were evaluated for pH, density, Brookfield rheology, and Fann rheology initially and after hot rolling at 180 F. for 16 hours, cooling, and mixing. The data obtained are set forth in Table A.

EXAMPLE 2

A fluid containing 3.0 lb/bbl chitosan, 3.0 lb/bbl glacial acetic acid, 1.0 lb/bbl succinic anhydride, 10.0 lb/bbl soda ash, and 3.5 lb/bbl sodium chloride was prepared. This fluid after aging 16 hours at room temperature had 0.5 and 100 rpm Brookfield viscosities of 95,000 and 1470 cp. respectively. After aging 16 hours at 185° F. and mixing, the viscosities were 73,000 and 930 cp.

EXAMPLE 3

Aqueous fluids were prepared containing 3 lb/bbl chitosan, 1.75 lb/bbl glacial acetic acid, and the concentrations of succinic anhydride, maleic anhydride, sodium chloride, soda ash, and sodium hydroxide set forth in Table B. These fluids were evaluated for pH and Brookfield viscosity. The data obtained are set forth in Table B.

EXAMPLE 4

Aqueous fluids were prepared containing 350 ml water (1 bbl equivalent), 3 grams of chitosan (3 lb/bbl equivalent), 1.75 grams glacial acetic acid, 1 gram succinic anhydride, the grams of glyoxylic acid set forth in Table C, and 9 grams of soda ash. The fluids were evaluated for Brookfield viscosity. Thereafter fluids C1, C2, and C3 were mixed with 5.5 grams of calcium chloride and aged 16 hours at room temperature and the Brookfield viscosity again obtained. The data are set forth in Table C.

EXAMPLE 5

Aqueous fluids were prepared containing 1 lb/bbl commercial household bleach disinfectant, 1.75 lb/bbl glacial acetic acid, 3 lb/bbl chitosan, and the concentrations of succinic anhydride, glyoxylic acid, pyruvic acid, and lactose set forth in Table D, and 10 lb/bbl soda ash. These fluids were evaluated for pH, Brookfield Rheology, and Fann Rheology both initially and after hot rolling at 180° F. for 16 hours, cooling to room temperature, and shearing for three minutes on an Osterizer blender. The data obtained are set forth in Table D.

EXAMPLE 6

Aqueous fluids were prepared containing 1.75 lb/bbl glacial acetic acid, 2 lb/bbl chitosan, 3.5 lb/bbl NaCl, and the concentrations of succinic anhydride, maleic anhydride, dodecenylsuccinic anhydride (DDSA), VICOLOX™ 18 octadecyl epoxide, soda ash, and KOH set forth in Table E. These fluids were evaluated for pH, Brookfield Rheology, and Fann Rheology initially. Thereafter they were hot rolled at 180° F. for 16 hours, and the rheology obtained at 180° F. The data are set forth in Table E.

EXAMPLE 7

Aqueous fluids were prepared containing 1.75 lb/bbl glacial acetic acid, 3 lb/bbl chitosan, the concentration of succinic anhydride set forth in Table F, the concentration of glyoxal, glutaraldehyde, or 4-hydroxybenzaldehyde set forth in Table F, 10 lb/bbl soda ash, and the concentration of NaCl set forth in Table F. The pH and Brookfield rheology of these fluids is set forth in Table F.

EXAMPLE 8

A fluid containing 3 lb/bbl chitosan, 2 lb/bbl glacial acetic acid, 1 lb/bbl succinic anhydride, 1 lb/bbl 4-carboxybenzaldehyde, and 10 lb/bbl soda ash was prepared. This fluid had 0.3 rpm, 0.6 rpm, and 100 rpm Brookfield viscosities of 1,120,000 cp., 5,530,000 cp., and 26,000 cp., respectively, and a pH of 10.3, all at 72.7° F.

EXAMPLE 9

Aqueous alkaline fluids were prepared containing 350 ml water, 3 g chitosan, 1 g succinic anhydride, the amount of various aldehydes set forth in Table G, and 10 g soda ash. The pH and Brookfield viscosities of the fluids are set forth in Table G.

TABLE A

| Fluid | A1 | A2 | A3 | A4 | A5 | A6 |
|---|---|---|---|---|---|---|
| Sodium Chloride, lb/bbl | 0 | 10 | 20 | 0 | 0 | 0 |
| Soda Ash, lb/bbl | 0 | 0 | 0 | 10 | 20 | 0 |
| Borax, lb/bbl | 0 | 0 | 0 | 0 | 0 | 1 |
| Initial Data | | | | | | |
| Density, lb/gal | 7.0 | 8.2 | 7.7 | 7.6 | 7.7 | 7.7 |
| pH | 10.3 | 10.3 | 10 | 1.9 | 10.9 | 10 |
| Brookfield Viscosity, cp | | | | | | |
| 0.3 rpm ($\times 10^{-3}$) | 48 | 23.3 | 50.7 | 47.3 | 110 | 181 |
| 0.5 rpm ($\times 10^{-3}$) | 32.8 | 15.2 | 30.4 | 28 | 75.2 | 124 |
| 100 rpm | 1026 | 612 | 994 | 1154 | 400 | 2800 |
| Fann Rheology | | | | | | |
| 600 rpm | 170 | 280 | 285 | OS | OS | 228 |
| 300 rpm | 130 | 190 | 205 | 285 | OS | 167 |
| PV, cp | 40 | 90 | 80 | — | — | 61 |
| YP, lb/100 ft$^2$ | 90 | 100 | 125 | — | — | 106 |
| After Hot Rolling for 16 Hr. at 180° F., Cooling and Mixing | | | | | | |
| Density, lb/gal | 6.1 | 7.3 | 7.0 | 6.7 | 7.2 | 6.5 |
| pH | 9.8 | 10 | 9.5 | 10.9 | 10.9 | 10.2 |
| Brookfield Viscosity, cp | | | | | | |
| 0.3 rpm ($\times 10^{-3}$) | 37.3 | 323 | 353 | 56 | 49.3 | 84 |
| 0.5 rpm ($\times 10^{-3}$) | 22 | 224 | 234 | 32.8 | 38.8 | 45.6 |
| 100 rpm | 540 | 950 | 1370 | 404 | 500 | 1042 |
| Fann Rheology | | | | | | |
| 600 rpm | 135 | 261 | 265 | 171 | 169 | 200 |
| 300 rpm | 90 | 165 | 193 | 114 | 120 | 143 |
| PV, cp | 45 | 96 | 72 | 57 | 49 | 57 |
| YP, lb/100 ft$^2$ | 45 | 69 | 121 | 57 | 71 | 86 |

TABLE B

| Fluid | B1 | B2 | B3 | B4 | B5 | B6 |
|---|---|---|---|---|---|---|
| Chitosan, lb/bbl | 3 | 3 | 3 | 3 | 3 | 3 |
| Glacial Acetic Acid, lb/bbl | 1.75 | 1.75 | 1.75 | 1.75 | 1.75 | 1.75 |
| Succinic Anhydride, lb/bbl | 0 | 0 | 0 | 0 | 1 | 1 |
| Maleic Anhydride, lb/bbl | 1 | 5 | 1 | 5 | 0 | 0 |
| NaCl, lb/bbl | 0 | 0 | 20 | 20 | 0 | 20 |
| Soda Ash, lb/bbl | 10 | 10 | 10 | 10 | 10 | 10 |
| Sodium Hydroxide, lb/bbl | 0 | * | 0 | 0 | 0 | 0 |
| Initial Properties | | | | | | |
| pH | 10.2 | 10.2 | 9.4 | 7.1 | 10.2 | 9.5 |
| Brookfield Viscosity, cp | | | | | | |
| 0.3 rpm, cp | 1667 | 190000 | 197000 | 267000 | 1333 | 68000 |
| 0.5 rpm, cp | 800 | 140000 | 116000 | 152000 | 600 | 48000 |
| 100 rpm, cp | 400 | 5300 | 4400 | 3820 | 384 | 1200 |

* Sufficient to raise the pH to 10.2

TABLE C

|  | C1 | C2 | C3 | C4 | C5 | C6 |
|---|---|---|---|---|---|---|
| Fluid |  |  |  |  |  |  |
| Water, ml | 350 | 350 | 350 | 350 | 350 | 350 |
| Chitosan, g | 3 | 3 | 3 | 3 | 3 | 3 |
| Glacial Acetic Acid, g | 1.75 | 1.75 | 1.75 | 1.75 | 1.75 | 1.75 |
| Succinic Anhydride, g | 1 | 1 | 1 | 1 | 1 | 1 |
| Glyoxylic Acid, g | 0 | 0.21 | 1.0 | 0.625 | 0.83 | 1.25 |
| Soda Ash, g | 9 | 9 | 9 | 9 | 9 | 9 |
| Initial Properties |  |  |  |  |  |  |
| pH | 9.7 | — | 9.7 | — | — | — |
| Brookfield Viscosity |  |  |  |  |  |  |
| 0.5 rpm, cp | 3000 | 6000 | 200000 | 175000 | 400000 | 480000 |
| 100 rpm, cp | 1370 | 1660 | 5150 | 6625 | 18200 | 24600 |
| After Adding Calcium Chloride and Aging 16 Hours at Room Temperature |  |  |  |  |  |  |
| Brookfield Viscosity |  |  |  |  |  |  |
| 0.5 rpm, cp | 20000 | 320000 | 1480000 | — | — | — |
| 100 rpm, cp | 2750 | 10000 | 23800 | — | — | — |

TABLE D

|  | D1 | D2 | D3 | D4 | D5 | D6 | D7 |
|---|---|---|---|---|---|---|---|
| Fluid |  |  |  |  |  |  |  |
| Succinic Anhydride, lb/bbl | 0 | 0.5 | 0.5 | 0.5 | 0.5 | 0.5 | 1.0 |
| Olyoxylic Acid, lb/bbl | 0 | 0 | 0.5 | 0.5 | 0 | 0 | 0 |
| Pyruvic Acid, lb/bbl | 0 | 0 | 0.5 | 0 | 0.5 | 0 | 0 |
| Lactose, lb/bbl | 0 | 0 | 0 | 0 | 0 | 4 | 4 |
| INITIAL PROPERTIES |  |  |  |  |  |  |  |
| pH | 10.3 | 10.2 | 10.0 | 10.1 | 10.1 | 10.1 | 10.0 |
| Brookfield Viscosity |  |  |  |  |  |  |  |
| 0.3 rpm, cp($\times 10^{-3}$) | 72 | 160 | 160 | 200 | 74 | 280 | 33 |
| 0.5 rpm, cp($\times 10^{-3}$) | 40 | 80 | 80 | 88 | 40.4 | 192 | 2 |
| 100 rpm, cp | 592 | 840 | 360 | 600 | 400 | 1360 | 455 |
| Fann Rheology |  |  |  |  |  |  |  |
| Plastic Viscosity, cp | 5 | 60 | 5 | 38 | 17 | 10 | 39 |
| Yield Point, lb/100 ft$^2$ | 35 | 70 | 3 | 37 | 28 | 5 | 71 |
| HOT ROLL 16 HOURS @ 180° F. |  |  |  |  |  |  |  |
| pH | 10.2 | 10.1 | 10.1 | 10.0 | 10.0 | 9.6 | 9.4 |
| Brookfield Viscosity |  |  |  |  |  |  |  |
| 0.3 rpm, cp ($\times 10^{-3}$) | 17 | 25.7 | 16.7 | 18.7 | 26.7 | 32 | 147 |
| 0.5 rpm, cp ($\times 10^{-3}$) | 9.4 | 13 | 5.6 | 9.6 | 15.2 | 22 | 88 |
| 100 rpm, cp | 164 | 223 | 254 | 266 | 291 | 430 | 4680 |
| Fann Rheology |  |  |  |  |  |  |  |
| Plastic Viscosity, cp | 8 | 12 | 11 | 14 | 9 | 21 | 40 |
| Yield Point, lb/100 ft$^2$ | 8 | 14 | 20 | 20 | 19 | 35 | 145 |

TABLE E

|  | E1 | E2 | E3 | E4 | E5 | E6 | E7 | E8 |
|---|---|---|---|---|---|---|---|---|
| Fluid |  |  |  |  |  |  |  |  |
| Succinic Anhydride, lb/bbl | 0.7 | 0.7 | 0.7 | 0.7 | 0 | 0 | 0 | 0 |
| Maleic Anhydride, lb/bbl | 0 | 0 | 0 | 0 | 1.5 | 1.5 | 1.5 | 1.5 |
| DDSA, lb/bbl | 0 | 2.5 | 0 | 2.5 | 0 | 2.5 | 0 | 2.5 |
| VICOLOX 18, lb/bbl | 0 | 0 | 0.5 | 0.5 | 0 | 0 | 0.5 | 0.5 |
| Soda Ash, lb/bbl | 9 | 10 | 8 | 10 | 9 | 10 | 8 | 10 |
| KOH, lb/bbl | 0 | 0 | 0.1 | 0.1 | 0 | 0 | 0.1 | 0.1 |
| INITIAL PROPERTIES |  |  |  |  |  |  |  |  |
| pH | 10.2 | 9.9 | 10.2 | 9.9 | 9.9 | 9.6 | 9.7 | 9.6 |
| Brookfield Viscosity |  |  |  |  |  |  |  |  |
| 0.3 rpm, cp ($\times 10^{-3}$) | 117 | 46.7 | 80 | 58 | 10.9 | 7.1 | 13.1 | 6.9 |
| 0.5 rpm, cp ($\times 10^{-3}$) | 56 | 26 | 46 | 32.9 | 7.6 | 4.0 | 6.1 | 4.3 |
| 100 rpm, cp | 470 | 910 | 1190 | 1532 | 144 | 146 | 167 | 139 |
| Fann Rheology |  |  |  |  |  |  |  |  |
| Plastic Viscosity, cp | 25 | 21 | 50 | 15 | 9 | 8 | 14 | 8 |
| Yield Point, lb/100 ft$^2$ | 20 | 24 | 100 | 55 | 13 | 13 | 12 | 14 |
| Temperature, °F. | 80.9 | 86.6 | 81.1 | 83.6 | 80.8 | 81.3 | 80.8 | 82.9 |
| HOT ROLL 16 HOURS @ 180° F. |  |  |  |  |  |  |  |  |
| Brookfield Viscosity |  |  |  |  |  |  |  |  |
| 0.3 rpm, cp ($\times 10^{-3}$) | 5.2 | 17.2 | 33.3 | 11.5 | 5.4 | 4.8 | 7.7 | 15.7 |
| 0.5 rpm, cp ($\times 10^{-3}$) | 3.0 | 9.8 | 22 | 6.8 | 2.9 | 2.9 | 4.5 | 17.0 |
| 100 rpm, cp | 80 | 134 | 1080 | 135 | 147 | 90 | 127 | 131 |
| Fann Rheology |  |  |  |  |  |  |  |  |
| Plastic Viscosity, cp | 7 | 4 | 44 | 5 | 6 | 4 | 5 | 16 |
| Yield Point, lb/100 ft$^2$ | 2 | 11 | 116 | 10 | 5 | 6 | 9 | 3 |
| Temperature, °F. | 180 | 180 | 180 | 180 | 180 | 180 | 180 | 180 |

TABLE F

|  | F1 | F2 | F3 | F4 | F5 |
|---|---|---|---|---|---|
| Fluid |  |  |  |  |  |
| Water, ml | 350 | 350 | 350 | 350 | 350 |
| Chitosan, g | 3 | 3 | 3 | 3 | 3 |
| Glacial Acetic Acid, g | 1.75 | 1.75 | 1.75 | 1.75 | 1.75 |
| Succinic Anhydride, g | 0.5 | 1.0 | 1.0 | 1.0 | 1.0 |
| Aldehyde, g | 0 | 0.01[1] | 0.005[1] | 0.01[2] | 0.5[3] |
| Soda Ash, g | 10 | 10 | 10 | 10 | 10 |
| NaCl, g | 0 | 4 | 0 | 4 | 0 |
| Initial Properties |  |  |  |  |  |
| pH | 10 | 9.2 | 9.9 | 10 | 9.4 |
| Brookfield Viscosity |  |  |  |  |  |
| 0.3 rpm, cp | 200000 | 387000 | 56000 | 400000 | 33333 |
| 0.5 rpm, cp | 100000 | 232000 | 44800 | 227000 | 25600 |
| 100 rpm, cp | 960 | 4300 | 3000 | 2640 | 2100 |

[1]glyoxal
[2]glutaraldehyde
[3]4-Hydroxybenzaldehyde

TABLE G

All Fluids Contain 3 lb/bbl Chitosan, 1 lb/bbl Succinic Anhydride, and 10 lb/bbl Soda Ash

|  | lb/bbl | Brookfield Viscosity, cp | | | |
|---|---|---|---|---|---|
| Aldehyde | Aldehyde | 0.3 rpm | 0.5 rpm | 100 rpm | pH |
| 4-Carboxybenzaldehyde | 1.0 | 56000 | 42000 | — | 9.9 |
| 1-Hydroxybenzaldehyde | 2.0 | 367000 | 248000 | 6900 | 9 |
| 1-Hydroxybenzaldehyde | 4.0 | 140000 | 90000 | 1570 | 8.7 |
| Salicylaldehyde | 0.6 | 17333 | 14000 | 700 | 9.4 |
| Salicylaldehyde | 1.1 | 65300 | 49600 | 300 | 9.2 |
| Vanillin | 2.0 | 67000 | 56000 | — | 9.5 |
| Vanillin | 5.0 | 122000 | 69000 | 525 | 8.4 |

What is claimed is:

1. A method of drilling a well wherein a drilling fluid is circulated in the wellbore during drilling comprising circulating as the drilling fluid an aqueous alkaline, chitosan-containing fluid which additionally contains an anhydride modifier.

2. The method of claim 1 wherein the anhydride is selected from the group consisting of alkanedioic acid anhydrides, alkenedioic acid anhydrides, substituted products of such anhydrides, and mixtures thereof, wherein the substituted products contain one or more functional groups selected from the group consisting of hydroxyl, carboxyl, alkenyl, amino, and mixtures thereof.

3. The method of claim 1 wherein the anhydride is selected from the group consisting of succinic anhydride, maleic anhydride, alkenyisuccinnic anhydrides wherein the alkenyl group contains from about 2 to about 20 carbon atoms, and mixtures thereof.

4. The method of claim 1 wherein the anhydride is dodecenylsuccinic anhydride.

5. The method of claim 1 wherein the anhydride is succinic anhydride.

6. The method of claim 5 wherein the weight ratio of anhydride to chitosan is from about 0.1 to 1 to about 1.5 to 1.

7. The method of claim 1, 2, 3, or 4 wherein the weight ratio of anhydride to chitosan is from about 0.1 to 1 to about 2.5 to 1.

8. The method of claim 1, 2, 3, 4, 5, or 6 wherein the fluid additionally contains an aldehyde therein.

9. The method of claim 8 wherein the aldehyde is selected from the group consisting of aldose or ketose sugars, oligosaccharides of the sugars containing up to about 10 sugar groups per molecule, alkanals containing from 1 to about 20 carbon atoms, substituted alkanals containing one or more functional groups, benzaldehyde, substituted benzaldehydes wherein the benzene ring contains one or more functional groups, and mixtures thereof.

10. The method of claim 8 wherein the aldehyde is selected from the group consisting of aldose or ketose sugars and oligosaccharides of the sugars containing up to about 10 sugar groups, and mixtures thereof, and wherein the sugars are selected from the group consisting of arabinose, mannose, galactose, glucose, xylose, and mixtures thereof.

11. The method of claim 10 wherein the aldehyde is lactose.

12. The method of claim 10 wherein the aldehyde is the water solubles resulting from the thermal hydrolysis of lignocellulose-containing materials.

13. The method of claim 8 wherein the aldehyde is selected from the group consisting of benzaldehyde, substituted benzaldehydes wherein the benzene ring contains one or more functional groups, and mixtures thereof, and wherein the functional group is selected from the group consisting of hydroxyl, carboxyl, and mixtures thereof.

14. The method of claim 8 wherein the aldehyde is selected from the group consisting of alkanals containing from 1 to about 20 carbon atoms, substituted alkanals containing one or more functional groups, and mixtures thereof, and wherein the functional group is selected from the group consisting of hydroxyl, carboxyl, amino, keto, —CHO, and mixtures thereof.

15. A well drilling and servicing fluid comprising an alkaline aqueous liquid, chitosan, an anhydride, and an aldehyde, wherein the anhydride is selected from the group consisting of alkanedioic acid anhydrides, alkenedioic acid anhydrides, substituted products of such anhydrides, and mixtures thereof, wherein the substituted products contain one or more functional groups selected from the group consisting of hydroxyl, carboxyl, alkenyl, amino, and mixtures thereof.

16. The fluid of claim 15 wherein the anhydride is selected from the group consisting of succinic anhydride, maleic anhydride, alkenylsuccinnic anhydrides wherein the alkenyl group contains from about 2 to about 20 carbon atoms, and mixtures thereof.

17. The fluid of claim 15 wherein the anhydride is dodecenylsuccinic anhydride.

18. The fluid of claim 15 wherein the anhydride is succinic anhydride.

19. The fluid of claim 18 wherein the weight ratio of anhydride to chitosan is from about 0.1 to 1 to about 1. 5 to 1.

20. The fluid of claim 15, 16, 17 or 18 wherein the weight ratio of anhydride to chitosan is from about 0.1 to 1 to about 2.5 to 1.

21. The fluid of claim 15 wherein the aldehyde is selected from the group consisting of aldose or ketose sugars, oligosaccharides of the sugars containing up to about 10 sugar groups per molecule, alkanals containing from 1 to about 20 carbon atoms, substituted alkanals containing one or more functional groups, benzaldehyde, substituted benzaldehydes wherein the benzene ring contains one or more functional groups, and mixtures thereof.

22. The fluid of claim 21 wherein the aldehyde is selected from the group consisting of aldose or ketose sugars and oligosaccharides of the sugars containing up to about 10 sugar groups, and mixtures thereof, and wherein the sugars are selected from the group consisting of arabinose, mannose, galactose, glucose, xylose, and mixtures thereof.

23. The fluid of claim 21 wherein the aldehyde is lactose.

24. The fluid of claim 21 wherein the aldehyde is the water solubles resulting from the thermal hydrolysis of lignocellulose-containing materials.

25. The fluid of claim 15 wherein the aldehyde is selected from the group consisting of benzaldehyde, substituted benzaldehydes wherein the benzene ring contains one or more functional groups, and mixtures thereof, and wherein the functional group is selected from the group consisting of hydroxyl, carboxyl, and mixtures thereof.

26. The fluid of claim 15 wherein the aldehyde is selected from the group consisting of alkanals containing from 1 to about 20 carbon atoms, substituted alkanals containing one or more functional groups, and mixtures thereof, and wherein the functional group is selected from the group consisting of hydroxyl, carboxyl, amino, keto, —CHO, and mixtures thereof.

* * * * *